Nov. 7, 1967  L. B. ALEXANDER  3,351,000
JUICE EXTRACTION APPARATUS WITH PULP-PEEL SEPARATOR
Filed Oct. 23, 1965

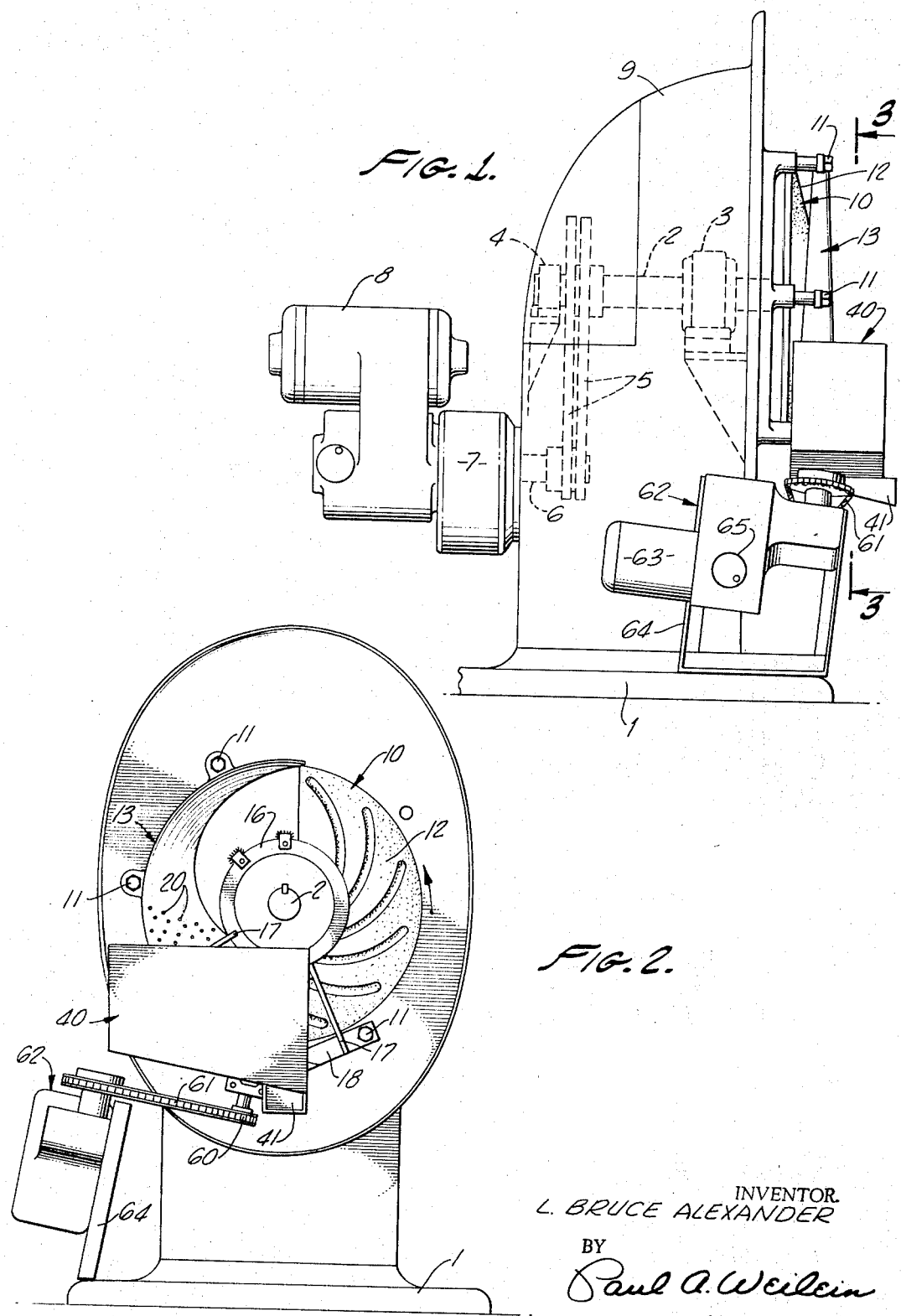

INVENTOR.
L. BRUCE ALEXANDER
BY
Paul A. Weilein
ATTORNEY

INVENTOR.
L. BRUCE ALEXANDER
BY
Paul A. Weilcin
ATTORNEY

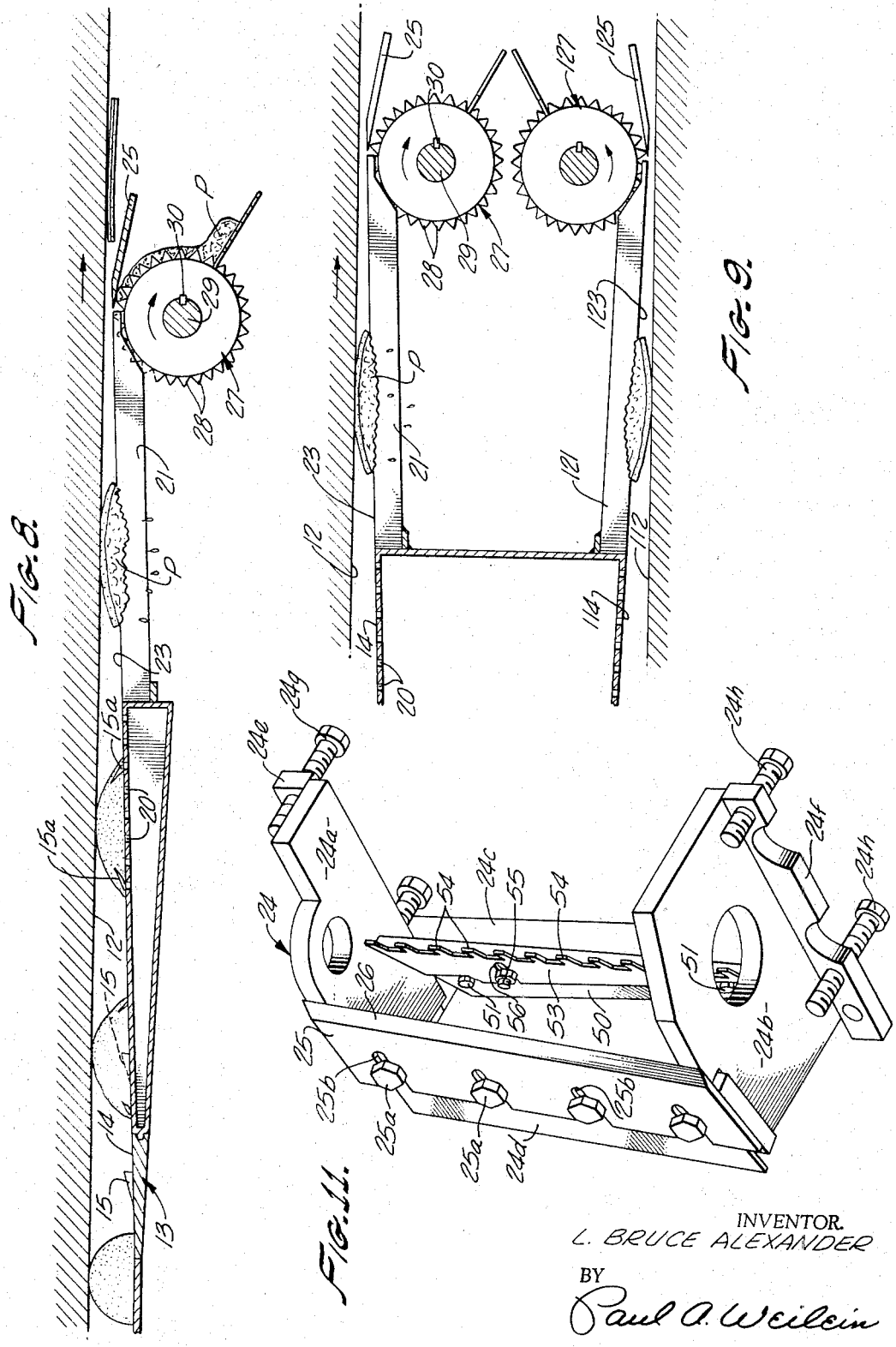

United States Patent Office 3,351,000
Patented Nov. 7, 1967

3,351,000
JUICE EXTRACTION APPARATUS WITH
PULP-PEEL SEPARATOR
L. Bruce Alexander, San Marino, Calif., assignor, by mesne assignments, to Automatic Machinery and Electronics, Inc., a corporation of California
Filed Oct. 23, 1965, Ser. No. 503,090
20 Claims. (Cl. 100—98)

ABSTRACT OF THE DISCLOSURE

A wall with a yielding surface moves in pressure contact with the outer surface of the peel of a cut section of citrus fruit to slide the cut section along a fixed perforate structure with the cut face of the fruit against the fixed perforate structure and with the fixed perforate structure converging towards the wall to form therewith a progressively narrowing passage for progressively flattening and squeezing the cut fruit with consequent release of juice and juice-bearing pulp through the perforate structure. Towards the narrow end of the convergent passage where the cut fruit is substantially flat, the fixed perforate structure has longitudinal slots through which the juice-bearing pulp of the flattened fruit projects and at the narrow end of the passage a knife in the path of the fruit is spaced uniformly from the yielding wall surface to shear the peel from the juice-bearing pulp. Rotary means positioned substantially tangential of the passage is formed with radial projections aligned with the slots of the fixed support to drive the flattened peels edgewise into the knife and at the same time to lacerate and squeeze the juice-bearing pulp that protrudes into the slots.

---

The present invention relates to citrus fruit juice extraction apparatus and more particularly to such apparatus having means for separating from the fruit peel the juice bearing pulp so as to enable more efficient removal of the juice from the juice cells which are carried in the pulp.

In certain types of citrus fruit juicing apparatus a pair of opposing walls are provided, which walls define a path having an inlet for reception of cut fruit sections and a discharge end at which such cut fruit sections are discharged following the application to the cut fruit sections of a gradually increasing deforming pressure whereby the cut fruit sections are progressively flattened as they move through the path toward the discharge end. Movement of the cut fruit sections through the path may be effected by movement of one of the walls defining the path.

Examples of such apparatus are shown in U.S. Patent No. 2,212,066 granted August 20, 1940 to L. A. Fry, wherein it will be seen that the convergent walls defining the path for the cut fruit sections as referred to above may be defined between a rotary cylinder and a cooperative stationary grid through which juice is expressed as the cut fruit sections are progressively subjected to pressure. Likewise, as illustrated in said patent the walls providing the path for the fruit sections may be defined by a travelling belt and a cooperative planar grid.

Another example of apparatus of the above described type will be seen in U.S. Patent No. 3,094,919 granted June 25, 1962 to F. W. Bireley et al., wherein the path is defined between a frusto-conical rotary disc and a cooperative grid which converges with the disc both radially and circumferentially whereby the cut fruit sections assume specific courses along the path which are spaced according to the size of the cut sections.

The present invention involves the combination with such juice extraction apparatus of means which will function at the discharge end of the path of travel of the fruit sections to effectively separate from the peel the pulpy material containing the juice sacs. Such separation of juice-bearing pulp and peel will preferably be accomplished substantially at the juncture between the pulp and peel, that is, at the membrane which separates the juice-bearing pulp from the albedo of the peel. Such separation of the juice-bearing pulp from the peel enables the subsequent treatment of the pulp to recover from the same a maximum quantity of the juice, whereas in the prior devices as referred to above, even though such machines are quite efficient and widely used in the volume removal of citrus juices, a certain amount of juice nevertheless remains trapped within the pulpy material which remains unitized with the peel as the squeezed fruit sections are discharged from the pressure applying path.

In accomplishing the foregoing, it is an object of the invention to provide at the discharge end of a juice extraction apparatus a number of grid rails extended longitudinally and spaced transversely of the path of travel of the fruit sections and to which the cut fruit section will be presented with the juice-bearing pulp in engagement with the grid rails, pressure being applied to the peel by a member converging relative to the rails and acting to cause movement of the fruit section along the rails, the juice-bearing pulp being caused to be displaced into the spaces between the rails, and the fruit section thus being presented to a cutting knife having a cutting edge extended transversely of the path at the discharge end of the rails while a rotor having fruit pulp engaging portions disposed between the rails will engage the fruit pulp to assist in forcing the fruit section past the peel-pulp separating knife.

Advantages accrue in respect of the volume and quality of the juice ultimately derived from the cut fruit sections by the apparatus of the invention. Firstly, inasmuch as the juice need not be wholly pressed from the juice-bearing pulp while the juice-bearing pulp is joined with the peel, the pressure applied to the fruit sections need not significantly exceed the pressure necessary to condition the same for severance of the juice-bearing pulp from the peel, that is, to flatten the peel to enable severance of the juice-bearing pulp therefrom substantially at the membrane between the pulp and the peel; thus, there will be a minimum of peel oils removed from the peel and mixed with the juice. Secondly, since the applied pressure need not be as great as heretofore applied to the juice-bearing pulp, particularly in the region of the fruit path at which the walls are closest, and since the juice-bearing pulp is free to be forced into the spaces between the grid bars, the pulp membranes are not so folded over and compressed as to entrap juice sacs and inhibit expression of the juice therefrom.

Other objects and advantages of the invention will be hereinafter described or will become apparent to those skilled in the art, and the novel features of the invention will be defined in the appended claims.

In the accompanying drawings:

FIG. 1 is a side elevation of a fruit juice extraction apparatus embodying the present invention;

FIG. 2 is a view in end elevation of the apparatus of FIG. 1;

FIG. 8 is a planar development of the fruit extraction apparatus of FIGS. 1-7 illustrating the provision of opposing walls providing for the expression of juice from the fruit in combination with the pulp-peel separating means of the invention;

FIG. 9 is a view illustrating a structure including multiple walls for expressing the juice from multiple fruit sections and combined with multiple pulp-peel separating means in accordance with the invention;

FIG. 11 is a detail view in perspective illustrating the pulp-peel separating knife means of the invention.

Like reference characters in the several views of the drawings and in the following description designate corresponding parts.

Figure 3:
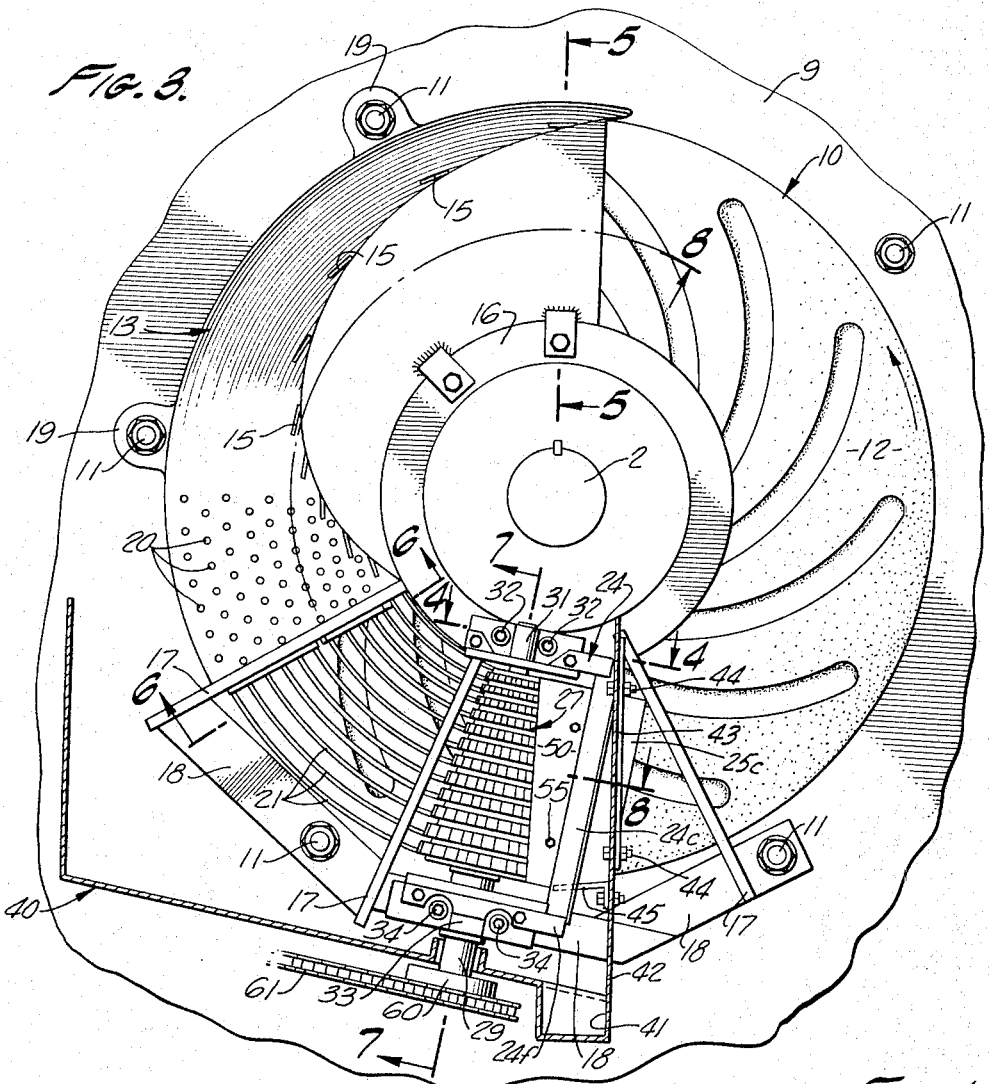
FIG. 3 is a fragmentary view partly in section and partly in elevation as taken on the plane of the line 3—3 of FIG. 1.

Referring first to FIGS. 1 and 2, there is generally illustrated an apparatus for expressing the juice from halves of citrus fruit supplied thereto and for separation of the pulp from the peel as the fruit sections are discharged from the apparatus. For the sake of simplicity, the juice expression apparatus as illustrated, while being a single stage apparatus, is essentially a single stage of the multiple stage fruit juice extractor illustrated and described in the above mentioned Bireley et al. patent.

In general the apparatus comprises a base 1 providing a support for a shaft 2 journalled in bearing block 3 adjacent one end and journalled in a bearing block 4 adjacent the other end. Means are provided for driving the shaft rotatively and such means may include drive belts 5 for effecting a drive between the shaft 2 and the power input shaft 6 leading from a gear box 7 driven by a motor 8. Shaft 2 and the just described related supporting bearings and belts are all enclosed within a suitable housing designated 9. Shaft 2 projects from housing 9 and supports at its outer end a frusto-conical disc-like member 10 which is composed of suitable resilient material or which has a suitable facing of resilient material, as is customary.

Disposed about the outer periphery of the disc 10 is a suitable number of angularly spaced bolts or posts 11 which are adapted to support in concentric relation about the shaft 2 an assemblage including means which cooperates with the conical face 12 of the disc 10 to provide the above mentioned convergent path for the reception and the application of pressure to cut fruit sections as well as the means for separating the peel and juice-bearing pulp of the fruit sections.

Figure 5:
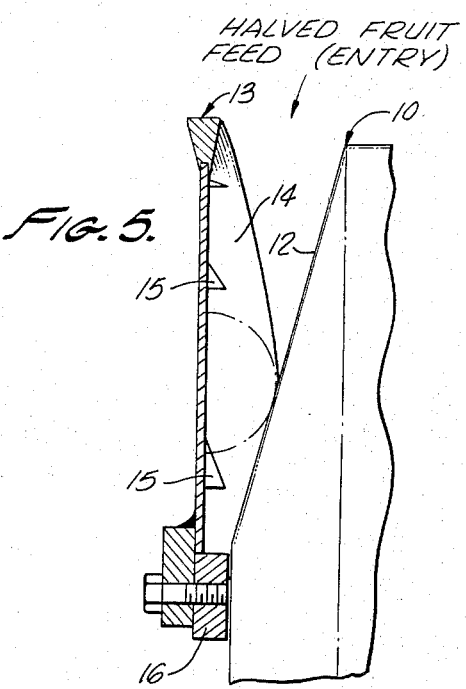
FIG. 5 is an enlarged fragmentary section as taken on the line 5—5 of FIG. 3.

Included in this subassembly is an arcuately extended plate 13 having an inner wall 14 which is opposed to the disc face 12 and, as seen in FIG. 5, for example, defines a radially divergent access opening or halved fruit feed or entry site. The wall 14 extends at an angle diminishing in the direction of fruit travel, i.e., in the direction of rotation of the disc 10 as shown by the arrows in FIGS. 2 and 3, so that the path defined between the disc wall 12 and the opposing wall 14 will progressively diminish so as to apply progressive pressure to a fruit half travelling therebetween.

As indicated at 15, the plate 13 may be provided with a series of spaced knife blades which will contact the exposed juice-bearing pulp or exposed cut face of the fruit halves as they progress through the convergent path to slit the same and to assist in the liberation of juice from the juice cells or sacs as well as to provide slits in the peel to facilitate its gradual compression from hemispherical shape to a substantially flat condition.

At its inner margin the plate 13 is connected to a central hub or ring 16 disposed about the shaft 2, and radiating from the hub 16 are a plurality of support arms 17 disposed in angularly spaced relation and interconnected by braces 18, 18. It will be noted that the bolts 11 are adapted to extend through ears 19 formed on the plate 13 as well as through the braces 18 so as to virtually support the subassemblage comprising the hub 16, plate 13, and radiating support arms 17 in relation to disc 10. At its lower region the plate 13 is provided with suitable perforations 20 so that it constitutes a grid, whereby as fruit halves travel progressively through the convergent path, the pressure applied to the fruit halves will force juice therefrom and through the grid work or perforations 20.

Figure 6:
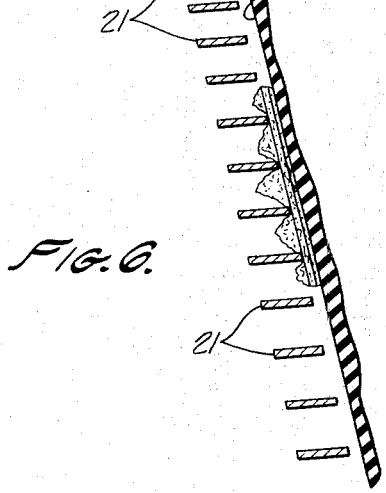
FIG. 6 is an enlarged fragmentary section as taken on the line 6—6 of FIG. 3.

In accordance with the invention, means are provided for supporting the cut fruit sections as they move off of the grid plate 13 in such a manner that the juice-bearing pulp may be effectively severed from the peel. Accordingly, extended between adjacent support arms 17 is a plurality of circumferentially extended grid rails 21 which are welded or otherwise suitably mounted upon the support arm 17 and which have edge surfaces 23 opposed to the conical wall 12 of the disc 10. These surfaces effectively constitute continuations of the wall 14 of the grid plate 13 and ultimately the fruit halves will be deformed between the edge surfaces 23 and the wall 12 of disc 10 so that as will be hereinafter more fully described, the juice-bearing pulp will be displaced into the spaces between the grid rails 21, as shown in FIG. 6. In the illustrative embodiment it will be noted that the grid rails 21 are progressively more widely spaced from the inner rails to the outer rails. Thus, since fruit halves between the walls 12 and 14 will travel in paths spaced radially of the disc depending upon the size of the fruit half in relation to the distance between the convergent walls, the smaller fruit sections will be supported on more closely spaced rails than larger fruit sections, so that the peels of each fruit section will be flattened against the opposing wall 12 of disc 10.

Knife means generally denoted at 24 including a blade 25 having a cutting edge 26 are provided and supported so that the cutting edge 26 will be presented to the oncoming fruit sections as they move past the ends of the grid rails 21 so as to cut the juice-bearing pulp from the peel, and means are provided for engaging the pulp in the spaces between the grid rails 23 to assist in urging the pulp and peel past the cutting edge of the knife.

Figure 10:
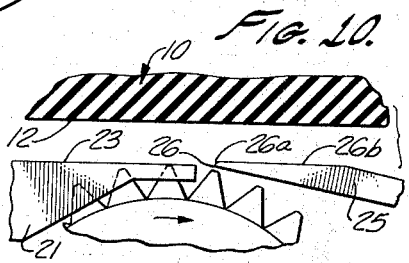
FIG. 10 is an enlarged fragmentary detail view illustrating the detail arrangement of the pulp-peel separating means.
Figure 7:
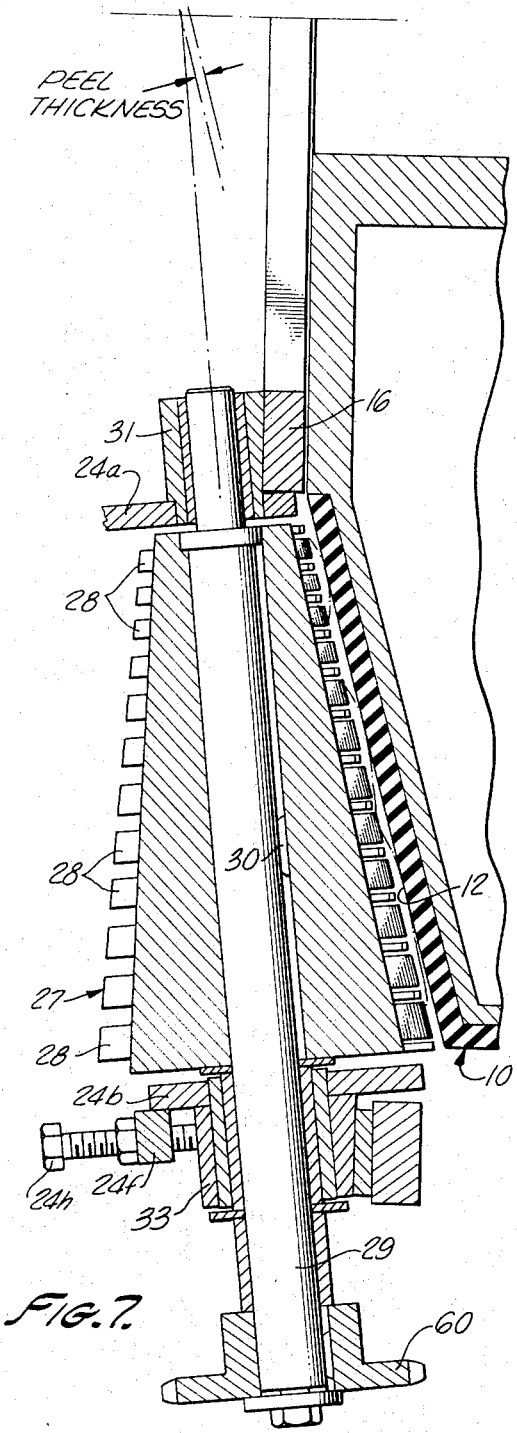
FIG. 7 is an enlarged fragmentary section as taken on the line 7—7 of FIG. 3.

The means for engaging the pulp of the fruit between the grid rails 23 includes a rotor 27 provided with axially spaced rows of lugs or hobs 28 which extend into the spaces between the grid rails 23, as best seen in FIGS. 7 and 10. In the embodiment illustrated herein, the rotor 27 is in the form of a frustum of a cone, mounted for rotation and having the outer extremities of its hobs 28 projecting to a line extended substantially parallel to the wall 12 of disc 10, as best seen in FIG. 7. Rotor 27 is mounted upon a shaft 29 so as to be rotated with the shaft by means of a suitable key 30, and the shaft is journalled at its inner end in a bearing block 31 which is secured to the hub 16 as by fasteners 32. The shaft 29 is journalled at its lower end in a bearing block 33 secured by fasteners 34 to one of the braces 18 previously described.

It will also be noted in connection with FIG. 3 that the axis of shaft 29 and therefore the axis of rotor 27 is substantially radial to the shaft 2 and, as shown in FIG. 7, the axis of the shaft 29 is so located in the bearing blocks 31 and 33 that the space between the outer extremities of hobs 28 and the opposing wall 12 of disc 10 will be approximately the thickness of an average citrus fruit peel. However, as previously noted, the disc wall 12 is composed of resilient material and hence may be deformed slightly by the peels, the inner or albedo layer of the peel regardless of thickness of different peels being always supported on the plane of edge surfaces 23 of grid rails 21 so as to most efficiently present the fruit sections to the cutting knife.

Figure 4:
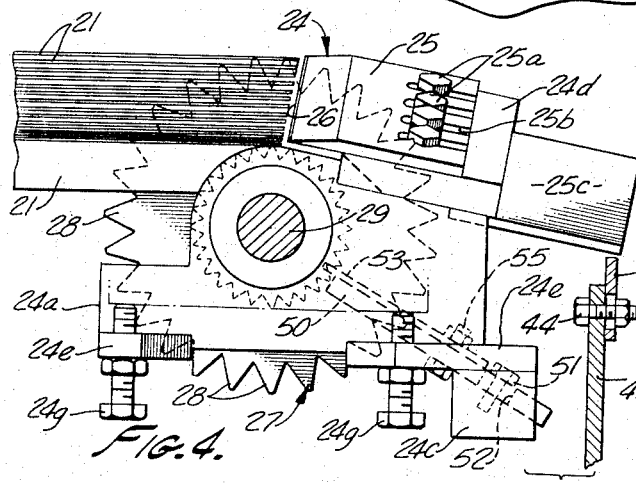
FIG. 4 is an enlarged fragmentary section as taken on the line 4—4 of FIG. 3.

In this connection, the knife edge 26 is preferably disposed relative to the free ends of the grid rails 21 so as to be presented to the interface between the juice-bearing pulp and the albedo of the peel. Means are provided for adjustably positioning the knife and in this connection it will be noted in FIG. 11 that the blade 25 of the knife means 24 is supported upon a carrier comprising end brackets 24a and 24b joined together in spaced relation by a stripper or comb support 24c and a knife blade support 24d. The end bracket 24a is pivotally mounted on the bearing block 31 for shaft 29 while the end bracket 24b of the knife means is pivotally mounted upon a bearing block 33 of the shaft 29 of rotor 27 so that the end brackets of the knife means may be adjusted angularly about the shaft 29. Knife blade 25 is supported on blade support 24d by means of fasteners 25a extended into the knife support 24d through elongated slots 25b. Thus, the knife is adapted to be adjusted relative to the ends of the grid rails 21 as a result of angular motion of the knife means 24 about the axis of shaft 29 as well as movement of the blade 25 on the plane of its support as permitted by the slots 24d. Preferably, moreover, knife support 24d extends between the end brackets 24a and 24b at an angle corresponding to the angle of the conical rotor 27 so that angular motion of the knife means about the axis of shaft 29 effects adjustment of the cutting edge 26 so that it remains substantially tangent to the rotor at all locations therealong but its cutting edge 26 will be moved toward and away from the free ends of the grid rails 21 which, as best seen in FIG. 4, preferably terminate on a line parallel to the cutting edge 26 of the knife.

Means are provided for effecting such adjustment of the knife means and in the illustrative embodiment each of the end brackets is shown as having thereon a flange respectively designated 24e on end bracket 24a, and 24f on end bracket 24b. In the flange 24e is a pair of adjustor screws 24g which are adapted to abut at their inner ends with the hub 16 while in the flange 24f of end bracket 24b there is a pair of adjustor screws 24h adapted to abut at their inner ends with the brace 18.

It will now be apparent that the position of the end brackets 24a and 24b and consequently the knife blade 25 may be varied by simple relative adjustment of the adjustor screws 24g or 24h. In addition, the blade 25, as noted above, is adjustably mounted on the knife support 24d so that in any relative angular position of the knife means and the free ends of the grid rails 21, the blade 25 may also be moved toward and away from the free ends of the grid rails. The fact that the knife blade may be adjusted as required for different batches of fruit having different peel thicknesses may be understood when it is considered that the knife carrier may be rotatably adjusted about the axis of the conical roller 27 to vary the spacing of the knife edge from the wall 12 of the disc 10 and that both the rotary position of the knife carrier and the position of the knife blade thereon can be adjusted to vary the angle of the knife blade relative to the wall of the disc.

In this connection, it will also be noted that adjacent the cutting edge 26 the knife blade 25, as best seen in FIG. 10, has a bevelled surface 26a which will tend to deflect the peel toward the wall 12 of disc 10 and in addition the blade 25 has an angularly disposed enlongated surface 26b which extends along a plane more or less parallel to the opposing wall 12 of the disc 10 to act as a heel or pressure foot to maintain the peel in engagement with the wall 12 of disc 10.

The subassembly mounted on the bolts 11 also includes a receiver denoted at 40 disposed beneath the grid portion or perforations of plate 13 as well as beneath the grid rails 21 and the knife means 24 for reception of juice expressed from the cut fruit as such juice passes through the grid openings 20 and between the grid rails 21 as well as to receive juice-bearing pulp removed from the peel by the knife means. The receiver 40 has a discharge outlet 41 so that the collected juice and juice-bearing pulp may be discharged into a suitable receiver or into a suitable apparatus for further extraction of the juice from the pulp and separation of the juice and pulp.

Means are provided for directing the fruit peel from which the juice-bearing pulp has been removed by knife means 24 away from the receiver 40 for subsequent handling and/or treatment of the peel as may be desired. In the illustrative embodiment such means for separately directing the peel comprises in part the knife blade 25 which will be seen in FIG. 4 to effectively provide a barrier between the peel and the rotor 27 as the peel moves past the knife means. In addition, in the illustrative embodiment the knife means is also provided with a sheet metal or other baffle 25c projecting outwardly from the blade support 24d and projecting past the side wall 42 of the receiver 40, as best seen in FIG. 4. If desired, the relationship between the wall 42 and the baffle 25c may be adjustable so that a small clearance therebetween may be maintained to prevent the passage of juice between these components. For this purpose there is, as illustrated best in FIG. 4, a baffle wall or extension 43 mounted upon the receiver wall 42 by a suitable number of fasteners 44 so that the baffle wall 43 may be adjusted relative to wall 42 toward and away from knife baffle 25c so as to permit of these members being in close proximity while at the same time enabling the knife means to be adjusted angularly with respect to the grid rails 21 as previously described. In addition, if desired, a baffle 45 in the form of an angle member may be suitably attached to the inside of receiver wall 42 to prevent the passage of peel downwardly between knife means 24 and disc wall 12, such a baffle 45 preferably being located, as shown in FIG. 3, at the periphery of wall 12.

Means are provided for stripping from the rotor 27 residual pulp following severing of the pulp from the peel by the knife blade 25. Referring particularly to FIGS. 3, 4, and 11, it will be noted that such stripping means comprises a plate 50 secured to the stripper support bar 25c of the knife means 24 by means of a suitable number of fasteners 51 adapted to pass through elongated slots 52 in the plate 50 so that the latter may be adjusted to a position at which its free end, as best seen in FIG. 3, extends parallel to the lugs or hobs 28 of the rotor 27 to strip therefrom any juice-bearing pulp contained thereby.

Adjustably mounted on the plate 50 is a stripper comb 53 having teeth 54 adapted to extend into the grooves between the rotor lugs or hobs 28 so as to strip therefrom any residual pulp retained thereby. Plate 50, as best seen in FIG. 11, is adapted to be mounted on the stripper support plate 50 by means of a suitable number of fasteners 55 which extend through slits 56 enabling adjustment of the comb 53 relative to the support plate 50.

As previously mentioned, the rotor 27 and more particularly the lugs 28 thereon which travel in the spaces between the grid rails 21 are adapted to engage the juice-bearing pulpy material of the fruit half sections to assist in causing movement of the latter past the cutting edge 26 of the knife means. Therefore, shaft 29 by which the rotor 27 is caused to revolve is adapted to be driven so as to cause movement of the lugs or hobs 28 in the spaces between grid rails 21 in the same direction in which the wall 12 of disc 10 is travelling relative to the rails 21. Such drive means, moreover, is preferably adapted to be adjusted so that a rate of speed may be selected for revolution of the rotor 27 whereby the peripheral speed of the rotor and the speed of travel of the wall 12 of disc 10 are at least approximately equal or if desired the speed of rotation of the rotor 27 may be greater than the speed of the disc wall 12 so as to assist in causing the lugs or hobs 28 to render the juice-bearing pulp and structurally break it down to assist in the subsequent removal of juice from the juice cells or sacs contained within the pulp.

The drive means for effecting rotation of the rotor includes a sprocket 60 mounted on rotor shaft 29, with a drive chain 61 engaging the sprocket 60. The chain is adapted to be driven by a variable speed drive mechanism generally denoted at 62 having a drive motor 63. The variable speed drive mechanism is supported on a suitable bracket 64 on the base 1 of the apparatus. Moreover, the variable speed drive may be of any desired type and would include an actuator 65 for effecting speed changes.

The apparatus specifically described above will function in the following manner with particular reference to FIG. 8, wherein the apparatus is diagrammatically shown in a planar development. In FIG. 8 it will be noted that, as indicated by the arrow, wall 12 is moved to the right. Wall 14 provides in combination with the wall 12 a gradually convergent path with the clearance diminishing in the direction of travel of the wall 12. The path has a cut fruit section inlet or halved fruit feed entry in which the slitting blades 15 are disposed for cutting slits 15a in the fruit peel and also for slicing through the exposed cut fruit face so as to assist in the removal of juice therefrom, as the cut fruit sections progress through the convergent path in the direction of the arrows and are progressively deformed from a substantially hemispherical to a more or less flat condition.

As the cut fruit sections pass onto the grid rails 21, the juice-bearing pulp P of the cut fruit sections will be caused to be displaced into the spaces between the rails 21 while the edge surfaces 23 of the rails continue to converge relative to wall 12 so as to still further progressively deform the cut fruit sections. As the cut fruit section moves past the cutting edge 26, the juice-bearing pulp P will be sheared by the cutting edge 26 from the peel of the fruit section substantially along the interface between the pulp and the albedo of the peel and, as shown in FIG. 8, the juice-bearing pulp will be stripped from the rotor 27 and collected in the receiver 40 while the peel progresses on to be separately collected.

By virtue of the structural arrangement just described in relation to FIG. 8, the apparatus of the invention enables the derivation from fruit halves of a higher volume of the recoverable juice than apparatus heretofore available. In addition, it has been found that the deforming pressure applied to the fruit halves need not be of the same magnitude as in the prior machines, since the fruit sections are supported on rails 21, in the region at which in such convergent path expression apparatus, the maximum juice expressing pressure is ordinarily applied, and the rails 21 offer considerably less resistance to movement of the fruit sections than do grids as employed in the prior devices, particularly grids of the perforated plate type. As a consequence, the recovered juice wil be comparatively free of objectionable peel oils which might otherwise be liberated from the peel and collected in the juice where heavy juice expressing pressure is applied. In addition, the residual peel with the juice-bearing pulp removed therefrom is in condition for subsequent treatment to obtain therefrom various peel constituents which are useful though undesirable in the collected juice.

As the cut fruit sections are frictionally propelled along the grid rails 21 towards the convergent end of the passage, the fruit peel becomes completely flattened with the juice-bearing pulp protruding into the channels defined by the grid rails and, of course, the resistance to movement of the peels correspondingly increases. The frictional driving force exerted on the cut fruit sections by the yielding surface of the disc is sufficient, however, to bring the flattened fruit sections up to the edge of the knife blade 25 but is usually insufficient to advance the flattened fruit against the blade for severance of the peel from the juice-bearing pulp. At this point, however, the hobs 28 of the rotor 27 make positive engagement with the juice bearing pulp of the flattened fruit sections to provide adequate force for driving the flattened fruit sections against the knife blade to carry out the severance operation. In addition to applying the necessary driving force to the flattened fruit sections, the hobs lacerate and compress the juice-bearing pulp to release the fruit juice. It is to be noted that all of the area of the pulp side of the peel is subjected to efficient mechanical treatment for release of all of the available fruit juice. Thus, the areas corresponding to the grid bars are effectively compressed for release of the fruit juice and the remaining areas where the juice-bearing pulp is confined in the slots formed by the grids are subjected to the lacerating and compressing action of the hobs of the rotor 27. Since the clearance between the hobs and the disc 10 is substantially equal to the thickness of the peel, the application of the final driving power by the hobbed rotor does not damage the oil bearing cells of the peel.

In FIG. 9 there is illustrated a somewhat modified apparatus in the sense that it is adapted to operate simultaneously upon two fruit halves which may be the opposite halves of a single fruit fed into the apparatus past means for cutting the fruit as disclosed, for example, in the aforementioned Bireley et al. U.S. patent. In essence, the structure of FIG. 9 involves a duplication of the structure of FIG. 8 accomplished as in the above mentioned Bireley patent by multiplication of the basic units consisting of a rotary disc and a juice expression plate. In FIG. 9, therefore, there are arranged in back-to-back relation to walls 12 and 14, grid bars 21, rotor 27, and knife 25, a duplicate set of walls 112 and 114, grid rails 121, rotor 127, and knife 125, whereby, as illustrated, a pair of cut fruit sections are simultaneously fed by movement of the walls 12 and 112 in the direction of the arrows along the rails 21 and 121 to the respective rotors 27 and 127 to effect pulp and peel separation at the respective knives 25 and 125.

While specific structural details have been shown and described, it should be understood that changes and alterations may be resorted to without departing from the spirit of the invention as defined in the appended claims.

I claim:
1. Citrus fruit juice extraction apparatus, comprising:
means providing a pair of opposing walls defining a path having an inlet for reception of cut fruit sections and a discharge end at which said cut fruit sections are discharged,
said walls converging along said path for applying progressive pressure to said cut frruit sections as said cut fruit sections move along said path toward said discharge end;
means for effecting such movement of said cut fruit sections;
means at said discharge end for separating the juice-bearing pulp from the peel of said cut fruit sections including:
grid means having grid rails extending along said path in spaced relation transversely of the direction of travel of said cut fruit sections;
a rotor having fruit pulp engaging portions thereon extending into the spaces between said grid rails;
means for rotating said rotor to move said pulp engaging portions in the direction of movement of said cut fruit sections;
knife means including a knife blade having a cutting edge adjacent said rotor and extended transversely of said grid bars for separating said juice-bearing pulp from the peel of said cut fruit sections as said cut fruit sections are driven by the rotor along said rails past said cutting edge; and
means for separately directing the discharge of said separated juice-bearing pulp and peel.
2. Apparatus as defined in claim 1, wherein said pulp engaging portions on said rotor comprise circularly spaced lugs.
3. Apparatus as defined in claim 1, including stripper means for removing juice-bearing pulp from said rotor following separation of said juice-bearing pulp from said peel.

4. Citrus fruit juice extraction apparatus, comprising:
means providing a pair of opposing walls defining a path having an inlet for reception of cut fruit sections and a discharge end at which said cut fruit sections are discharged,
said walls converging along said path for applying progressive pressure to said cut fruit sections as said cut fruit sections move along said path toward said discharge end; means for effecting such movement of said cut fruit section; and means at said discharge end for separating the juice-bearing pulp from the peel of said cut fruit sections including:
 means for supporting said cut fruit sections with the juice-bearing pulp of said sections projecting from the peel thereof;
 a rotor having fruit pulp engaging portions thereon disposed adjacent said means for supporting said cut fruit sections and revolvable relative thereto to effect progressive engagement of said fruit pulp engaging portions with said juice-bearing pulp; and
 knife means including a knife having a cutting edge extended transversely of the path of movement of said cut fruit sections and adjacent said rotor for separating said juice-bearing pulp from the peel of said cut fruit sections as said cut fruit sections are moved by said rotor past said cutting edge.

5. Apparatus as defined in claim 4, wherein
said means for supporting said cut fruit sections includes a plurality of longitudinally extended laterally sepaced rails; and
said pulp engaging portions of said rotor extend into the spaces between said rails.

6. Apparatus as defined in claim 4, wherein
said means for supporting said cut fruit sections includes a plurality of longitudinally extended laterally spaced rails;
said pulp engaging portions of said rotor extend into the spaces between said rails;
said cutting edge of said knife means is disposed adjacent said rotor in spaced relation to said rails; and
means is included for adjusting the spaced relationship between said cutting edge and said rails.

7. In combination, citrus fruit juice extraction apparatus, comprising:
means defining a convergent path through which cut fruit sections pass for the application thereto of progressive deforming pressure;
means at the discharge end of said path for flattening cut fruit sections and separating the peel and juice bearing pulp of said sections including:
 means for causing said juice-bearing pulp to project from said peel while said peel is flattened;
 a rotor engageable with said projecting juice-bearing pulp;
 a knife extended transversely of the path of movement of said cut fruit sections adjacent said rotor and having a cutting edge mounted for engagement with said cut fruit section at the interface of said projecting juice-bearing pulp and said flattened peel; and
 means for causing rotation of said rotor to drive said cut fruit sections past said knife.

8. Citrus fruit juice extraction apparatus, comprising:
a base support;
a shaft extending horizontally in said support;
a frusto-conical disc mounted on said shaft;
means for rotating said shaft;
means cooperative with said frusto-conical disc for forming therewith a path for the travel of cut fruit sections which path converges radially inwardly of said disc as well as circumferentially of said disc in the direction of rotation of said disc;
a plurality of circumferentially extended radially spaced grid rails forming with said disc a continuation of said path;
a rotor having fruit pulp engaging portions disposed in the spaces between said rails and mounted to extend substantially radially of said disc;
said rotor being frusto-conical and converging toward the axis of said disc;
knife means supported adjacent said rotor and having a cutting edge confronting the ends of said rails; and
means for rotating said rotor so that said fruit engaging portions move in the direction of said disc.

9. Citrus fruit juice extraction apparatus as defined in claim 8,
wherein said rails and said pulp engaging portions of said rotor are progressively wider spaced outwardly from the apex of said disc.

10. Citrus fruit juice extraction apparatus as defined in claim 8,
wherein means are provided for adjusting the disposition of said cutting edge relative to said rails and to said disc.

11. Citrus fruit juice extraction apparatus as defined in claim 8,
wherein said means for rotating said rotor includes means for varying the speed of rotation thereof.

12. Citrus fruit juice extraction apparatus, comprising:
means providing a pair of opposing walls defining a path having an inlet for reception of cut fruit sections and a discharge end at which said cut fruit sections are discharged,
said walls converging along said path for applying progressive pressure to said cut fruit sections as said cut fruit sections move along said path toward said discharge end;
means for effecting such movement of said cut fruit sections;
means at said discharge end for separating the juice-bearing pulp from the peel of said cut fruit sections including:
 grid means having grid rails extending along said path in spaced relation transversely of the direction of travel of said cut fruit sections;
 a rotor having fruit pulp engaging portions thereon extending into the spaces between said grid rails;
 means for rotating said rotor to move said pulp engaging portions in the direction of movement of said cut fruit sections;
 knife means including a knife blade having a cutting edge extended transversely of said grid bars for separating the juice-bearing pulp from the peel of said cut fruit sections as said cut fruit sections are moved along said rails past said cutting edge; and
 means for separately directing the discharge of said separated juice-bearing pulp and peel, said knife means including: a knife; a support for said knife; means mounting said support for angular movement about the axis of rotation of said rotor; and means for adjusting the position of said support to adjust the position of said knife relative to said grid rails.

13. Citrus fruit juice extraction apparatus, comprising:
means providing a pair of opposing walls defining a path having an inlet for reception of cut fruit sections and a discharge end at which said cut fruit sections are discharged,
said walls converging along said path for applying progressive pressure to said cut fruit sections as said cut fruit sections move along said path toward said discharge end;
means for effecting such movement of said cut fruit sections;

means at said discharge end for separating the juice-bearing pulp from the peel of said cut fruit sections including:
grid means having grid rails extending along said path in spaced relation transversely of the direction of travel of said cut fruit sections;
a rotor having fruit pulp engaging portions thereon extending into the spaces between said grid rails;
means for rotating said rotor to move said pulp engaging portions in the direction of movement of said cut fruit sections;
knife means including a knife blade having a cutting edge extended transversely of said grid bars for separating said juice-bearing pulp from the peel of said cut fruit sections as said cut fruit sections are moved along said rails past said cutting edge; and
means for separately directing the discharge of said separated juice-bearing pulp and peel,
said knife means including a knife blade with a beveled surface leading from the cutting edge of the blade for deflecting said peel toward the opposing converging wall.

14. Citrus fruit juice extraction apparatus, comprising:
means providing a pair of opposing walls defining a path having an inlet for reception of cut fruit sections and a discharge end at which said cut fruit sections are discharged,
said walls converging along said path for applying progressive pressure to said cut fruit sections as said cut fruit sections move along said path toward said discharge end;
means for effecting such movement of said cut fruit sections;
means at said discharge end for separating the juice-bearing pulp from the peel of said cut fruit sections including:
grid means having grid rails extending along said path in spaced relation transversely of the direction of travel of said cut fruit sections;
a rotor having fruit pulp engaging portions thereon extending into the spaces between said grid rails;
means for rotating said rotor to move said pulp engaging portions in the direction of movement of said cut fruit sections;
knife means including a knife blade having a cutting edge extended transversely of said grid bars for separating said juice-bearing pulp from the peel of said cut fruit sections as said cut fruit sections are moved along said rails past said cutting edge; and
means for separately directing the discharge of said separated juice-bearing pulp and peel, said means providing said walls comprising: a frusto-conical disc; and a grid plate mounted adjacent said disc and having a wall disposed at an angle relative to the disc, said grid rails constituting a continuation of said grid plate.

15. Citrus fruit juice extraction apparatus, comprising:
means providing a pair of opposing walls defining a path having an inlet for reception of cut fruit sections and a discharge end at which said cut fruit sections are discharged,
said walls converging along said path for applying progressive pressure to said cut fruit sections as said cut fruit sections move along said path toward said discharge end;
means for effecting such movement of said cut fruit sections;
means at said discharge end for separating the juice-bearing pulp from the peel of said cut fruit sections including:
grid means having grid rails extending along said path in spaced relation transversely of the direction of travel of said cut fruit sections;
a rotor having fruit pulp engaging portions thereon extending into the spaces between said grid rails;
means for rotating said rotor to move said pulp engaging portions in the direction of movement of said cut fruit sections;
knife means including a knife blade having a cutting edge extended transversely of said grid bars for separating said juice-bearing pulp from the peel of said cut fruit sections as said cut fruit sections are moved along said rails past said cutting edge; and
means for separately directing the discharge of said separated juice-bearing pulp and peel, said means providing said walls comprising: a frusto-conical disc; a grid plate mounted adjacent said disc and having a wall disposed at an angle relative to the disc, said grid rails constituting a continuation of said grid plate, said rotor being frusto-conical in form and extending generally radially of said frusto-conical disc with said pulp engaging portions disposed along a line substantially parallel to said frusto-conical disc.

16. Citrus fruit juice extraction apparatus, comprising:
means providing a pair of opposing walls defining a path having an inlet for reception of cut fruit sections and a discharge end at which said cut fruit sections are discharged,
said walls converging along said path for applying progressive pressure to said cut fruit sections as said cut fruit sections move along said path toward said discharge end;
means for effecting such movement of said cut fruit sections;
means at said discharge end for separating the juice-bearing pulp from the peel of said cut fruit sections including:
grid means having grid rails extending along said path in spaced relation transversely of the direction of travel of said cut fruit sections;
a rotor having fruit pulp engaging portions thereon extending into the spaces between said grid rails;
means for rotating said rotor to move said pulp engaging portions in the direction of movement of said cut fruit sections;
knife means including a knife blade having a cutting edge extended transversely of said grid bars for separating said juice-bearing pulp from the peel of said cut fruit sections as said cut fruit sections are moved along said rails past said cutting edge; and
means for separately directing the discharge of said separated juice-bearing pulp and peel, said means providing said walls comprising: a frusto-conical disc, a grid plate mounted adjacent said disc and having a wall disposed at an angle relative to said disc, said grid rails constituting a continuation of said grid plate, said rotor being frusto-conical in form and extending generally radially of said frusto-conical disc with said pulp engaging portions disposed along a line substantially parallel to said frusto-conical disc, said knife means including a support for said blade means mounting said support for movement angularly about the axis of said rotor; and means mounting said blade on said support with said cutting edge extending parallel to said rotor.

17. Citrus fruit juice extraction apparatus, comprising:
means providing a pair of opposing walls defining a path having an inlet for reception of cut fruit sections and a discharge end at which said cut fruit sections are discharged, said walls converging along said path for applying progressive pressure to said cut fruit sections as said cut fruit sections move along said path toward said discharge end;

means for effecting such movement of said cut fruit sections;

means at said discharge end for separating the juice-bearing pulp from the peel of said cut fruit sections including:

grid means having grid rails extending along said path in spaced relation transversely of the direction of travel of said cut fruit sections;

a rotor having fruit pulp engaging portions thereon extending into the spaces between said grid rails;

means for rotating said rotor to move said pulp engaging portions in the direction of movement of said cut fruit sections;

knife means including a knife blade having a cutting edge extended transversely of said grid bars for separating said juice-bearing pulp from the peel of said cut fruit sections as said cut fruit sections are moved along said rails past said cutting edge; and means for separately directing the discharge of said separated juice-bearing pulp and peel, said means providing said walls comprising: a frusto-conical disc, a grid plate mounted adjacent said disc and having a wall disposed at an angle relative to said disc, said grid rails constituting a continuation of said grid plate, said rails and said pulp engaging portion of said rotor being progressively more widely spaced outwardly from the rail nearest the apex of said disc.

18. In a citrus fruit processing apparatus for separating the peel from the juice-bearing pulp of cut fruit sections with minimum disturbance of the oil bearing outer cells of the peel, the combination of:

a first wall means;

a second wall means, said two wall means being convergently aligned to form a passage having a relatively wide entrance to accept the cut fruit sections and an exit restricted in dimension to flatten the cut fruit sections, said first wall means being a perforate structure for contact with the cut faces of the cut fruit sections, said perforate structure having slots longitudinally of the passage leading to the exit of the passage for projection of the juice-bearing pulp from the peel into the slots as the cut fruit sections are flattened, said second wall means being resiliently deformable to yieldingly contact the outer peel surfaces of the cut fruit sections and being movable relative to the first wall means to continuously move the fruit sections along the perforate structure with consequent flattening of the peel of the cut fruit sections and protrusion of the juice-bearing pulp of the cut fruit sections from the peel into said slots as the cut fruit sections are flattened;

knife means near the exit end of the passage in the path of the flattened fruit sections and spaced from said second wall means to sever the flattened peel from the juice-bearing pulp; and rotary means near the exit end of the passage having projections aligned with said slots to engage the juice-bearing pulp of the flattened fruit sections to drive the flattened cut fruit sections into the knife means to sever the peel of each cut fruit section from the juice-bearing pulp thereof.

19. A combination as set forth in claim 18 in which said second wall means is free from peel-penetrating projections.

20. In an apparatus for processing citrus fruit wherein cut sections of the fruit are moved along a processing passage and rotary means substantially tangential to the passage engages the cut sections of the fruit to drive the sections against a knife blade, the improvement comprising:

said knife blade being mounted on a carrier;

said carrier being rotatable about the axis of said rotary means for adjustment of the blade relative to said passage;

said blade being adjustable relative to the carrier for advance and retraction of the blade in the plane of the blade whereby the angle of the blade relative to said passage may be varied by rotary adjustment of the carrier and advance or retraction of the blade relative to the carrier.

References Cited

UNITED STATES PATENTS

| | | | |
|---|---|---|---|
| 2,212,066 | 8/1940 | Fry | 146—236 |
| 2,479,194 | 8/1949 | Eastman | 100—97 |
| 2,540,014 | 1/1951 | Smith | 100—97 X |
| 2,722,255 | 11/1955 | Townsend | 146—130 |
| 3,017,821 | 1/1962 | Bireley et al. | 100—97 |
| 3,094,919 | 6/1963 | Bireley et al. | 100—39 |
| 3,183,825 | 5/1965 | James | 100—98 |
| 3,215,179 | 11/1965 | Schill | 146—130 |

BILLY J. WILHITE, *Primary Examiner.*